(12) United States Patent
Sugimoto (10) Patent No.: US 11,763,123 B2
(45) Date of Patent: Sep. 19, 2023

(54) RFID TAG

(71) Applicant: KYOCERA Corporation, Kyoto (JP)

(72) Inventor: Yoshimasa Sugimoto, Omihachiman (JP)

(73) Assignee: Kyocera Corporation, Kyoto (JP)

( * ) Notice: Subject to any disclaimer, the term of this patent is extended or adjusted under 35 U.S.C. 154(b) by 182 days.

(21) Appl. No.: 17/442,719

(22) PCT Filed: Mar. 17, 2020

(86) PCT No.: PCT/JP2020/011579
§ 371 (c)(1),
(2) Date: Sep. 24, 2021

(87) PCT Pub. No.: WO2020/196067
PCT Pub. Date: Oct. 1, 2020

(65) Prior Publication Data
US 2022/0188590 A1    Jun. 16, 2022

(30) Foreign Application Priority Data
Mar. 26, 2019 (JP) .................... 2019-058550

(51) Int. Cl.
*G06K 19/077* (2006.01)
*G06K 19/07* (2006.01)
*H01Q 1/22* (2006.01)

(52) U.S. Cl.
CPC ... *G06K 19/07707* (2013.01); *G06K 19/0704* (2013.01); *G06K 19/0707* (2013.01); *G06K 19/0723* (2013.01); *G06K 19/07773* (2013.01); *H01Q 1/2208* (2013.01)

(58) Field of Classification Search
CPC ......... G06K 19/0723; G06K 19/07773; H01Q 1/2208
See application file for complete search history.

(56) References Cited

U.S. PATENT DOCUMENTS

| 11,303,032 B2 * | 4/2022 | Jo ........................ H01Q 19/24 |
| 2011/0037665 A1 * | 2/2011 | Ahn ...................... H01Q 5/378 343/702 |
| 2016/0183653 A1 | 6/2016 | Warther |

FOREIGN PATENT DOCUMENTS

| JP | 2002-065418 A | 3/2002 |
| JP | 2017-072939 A | 4/2017 |
| JP | 2018-190351 A | 11/2018 |

* cited by examiner

*Primary Examiner* — Sonji N Johnson
(74) *Attorney, Agent, or Firm* — Volpe Koenig

(57) ABSTRACT

An RFID tag includes a circuit board and a plurality of functional modules. The circuit board has an antenna conductor and a ground plane. On the circuit board, a control circuit and an RFID IC are mounted. The functional modules are connected to the circuit board. The circuit board includes a main part and an extended part. The main part includes a mounting plane for the control circuit and the ground plane. The extended part includes the antenna conductor and is integrated with the main part. The extended part and the antenna conductor are longer than one edge of the main part and disposed along the one edge.

11 Claims, 7 Drawing Sheets

RFID TAG

TECHNICAL FIELD

The present disclosure relates to an RFID (Radio Frequency Identifier) tag including a plurality of functional modules.

BACKGROUND

There is disclosed in JP 2002-65418 A an RFID tag including a plurality of functional modules, such as a solar cell and a liquid crystal display device.

SUMMARY

An RFID tag according to the present disclosure includes:
a circuit board that has an antenna conductor and a ground plane and where a control circuit and an RFID IC are mounted; and
a plurality of functional modules connected to the circuit board,
wherein the circuit board includes:
a main part including: a mounting plane for the control circuit; and the ground plane; and
an extended part including the antenna conductor and integrated with the main part, and
wherein the extended part and the antenna conductor are longer than one edge of the main part and disposed along the one edge.

Another RFID tag according to the present disclosure includes:
a circuit board that has an antenna conductor and a ground plane and where a control circuit and an RFID IC are mounted; and
a first functional module, a second functional module and a third functional module connected to the circuit board,
wherein the circuit board includes:
a main part including: a mounting plane for the control circuit; and the ground plane; and
an extended part including the antenna conductor and integrated with the main part,
wherein the first functional module overlaps the main part in a direction perpendicular to a board surface and does not overlap the extended part in the perpendicular direction,
wherein the second functional module and the third functional module are disposed on respective sides of the first functional module, and
wherein as viewed in the perpendicular direction, the extended part and the antenna conductor extend (i) along one edge of the main part, (ii) between the first functional module and the second functional module, and (iii) between the first functional module and the third functional module.

DETAILED DESCRIPTION

Hereinafter, embodiments of the present disclosure will be described in detail with reference to the drawings. In the following, directions are described using directions of three axes, X, Y and Z, which are at right angles to one another shown in the drawings. The X, Y and Z directions may be referred to as right-left/lateral direction, up-down direction and front-back direction, respectively. However, these directions may not be the same as directions of an RFID tag 1 in use. The Z direction corresponds to a direction perpendicular to the board surface of a circuit board 20.

First Embodiment

Figure 1:
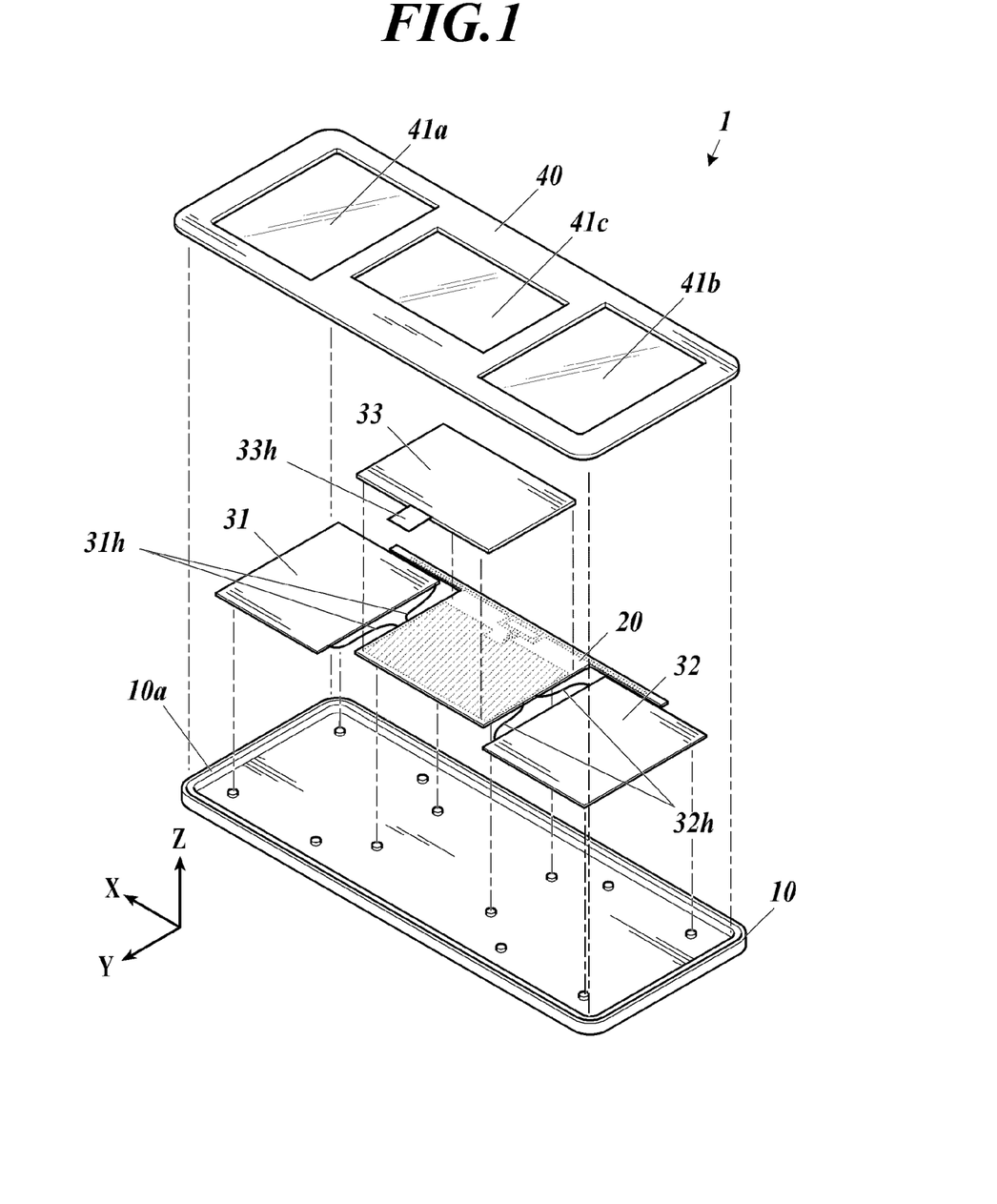
FIG. 1 is an exploded perspective view of an RFID tag according to a first embodiment of the present disclosure.

FIG. 1 is an exploded perspective view of an RFID tag according to a first embodiment of the present disclosure. An RFID tag 1 of the first embodiment includes a case 10, a circuit board 20, photovoltaic panels 31, 32, a display 33 and a lid 40. The display 33 corresponds to an example of a first functional module according to the present disclosure. The photovoltaic panels 31, 32 correspond to examples of a second functional module and a third functional module according to the present disclosure.

The case 10 is concave with one side opened, and can accommodate the circuit board 20 and the display 33 on top of one another and the two photovoltaic panels 31, 32 on the left and right of the display 33. The case 10 is made of, as a main material, engineering plastic, such as ABS (acrylonitrile butadiene styrene resin), PC (polycarbonate), POM (polyacetal), PP (polypropylene), PPS (polyphenylene sulfite), PA (polyamide), EVA (ethylene vinyl acetate copolymer), PE (polyethylene), PBT (polybutylene terephthalate), PS (polystyrene), EP (epoxy resin) or PF (phenolic resin), and formed, for example, by injection molding. The case 10 may be formed of a mixture of any of the above materials as a main material with another material, or may be formed of such a material further containing inorganic filler.

The display 33 is, for example, a liquid crystal display panel, and electrically connected to the circuit board 20 through a wiring (e.g. a film wiring) 33h. The photovoltaic panels 31, 32 generate electric power by receiving light from outside. Each of the display 33 and the photovoltaic panels 31, 32 may have a shape of a rectangular plate. The photovoltaic panels 31, 32 are electrically connected to the circuit board 20 through wirings (e.g. lead wires) 31h, 32h. The wirings 31h to 33h may be detachably connected to the circuit board 20 through connectors thereon.

The lid 40 has transparent windows 41a to 41c in areas respectively facing the photovoltaic panels 31, 32 and the display 33, and is joined to the inner frame 10a of the case 10 to seal off the case 10.

Figure 2:
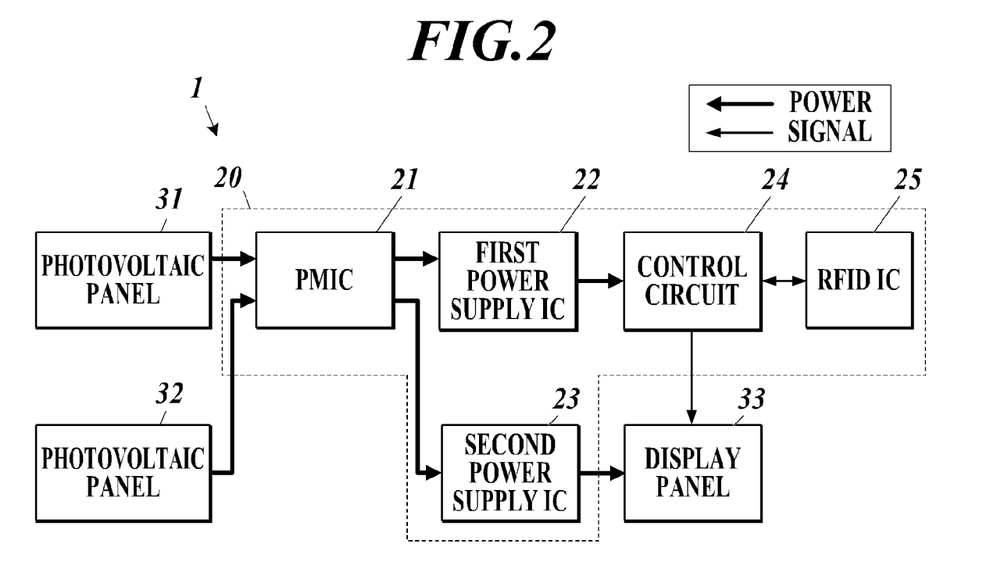
FIG. 2 is a block diagram showing circuit configuration of the RFID tag of the first embodiment.

FIG. 2 is a block diagram showing circuit configuration of the RFID tag of the first embodiment. The RFID tag 1 includes a PMIC (Power Management Integrated Circuit) 21 that receives generated power from the photovoltaic panels 31, 32 and manages the power, a first power supply IC 22 that receives power from the PMIC 21 and generates a power supply voltage for a control system, and a second power supply IC 23 that receives power from the PMIC 21 and generates a drive voltage for the display 33. The RFID tag 1 also includes: an RFID IC 25 that performs wireless communication with a reader/writer through radio waves; and a control circuit 24 that communicates with the RFID IC 25 and controls display of the display 33. The control circuit 24 and the RFID IC 25 operate by receiving the power supply voltage from the first power supply IC 22. The RFID IC 25 performs wireless communication by using, for example, radio waves in the UHF (Ultra High Frequency) band. The RFID IC 25 includes a reader/writer readable/writable storage. In the storage, identification information, management information and/or the like is stored. The control circuit 24 is, for example, a microcomputer, and can read out the information in the storage of the RFID IC 25 by communicating with the RFID IC 25. The control circuit 24 controls display content of the display 33 on the basis of the read-out information. The PMIC 21, the first power supply IC 22, the second power supply IC 23, the control circuit 24 and the RFID IC 25 are mounted on the circuit board 20.

Figure 3:
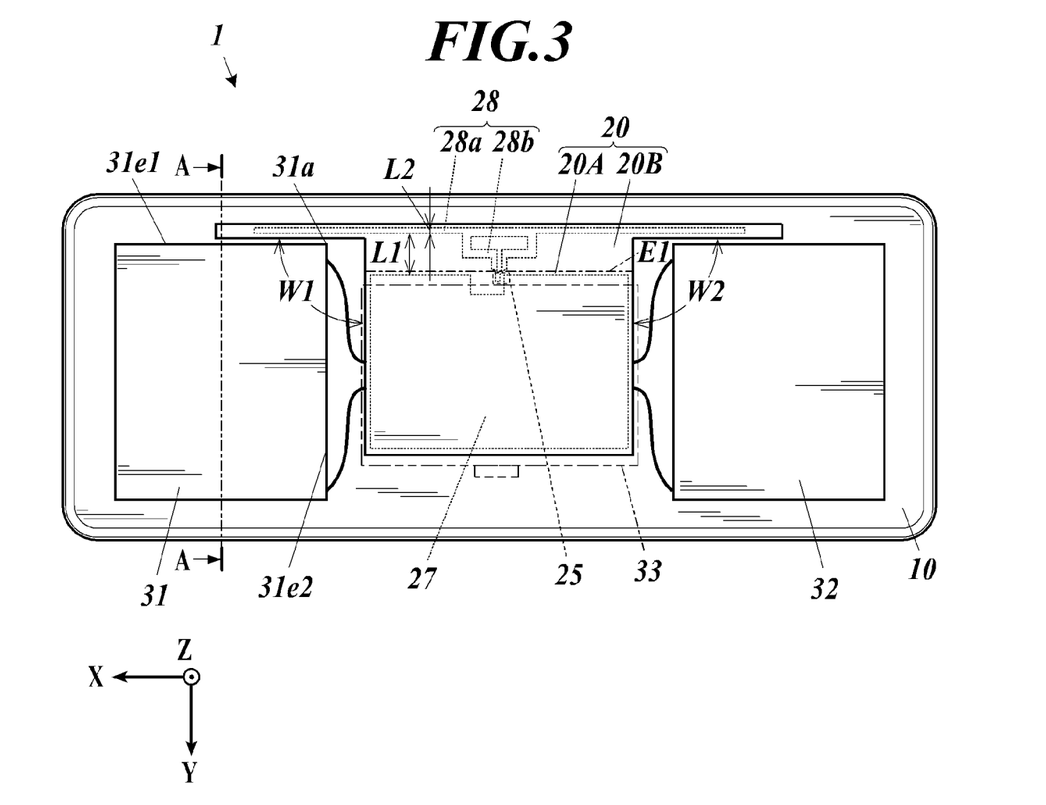
FIG. 3 is a plan view of configuration in which a circuit board and functional modules are mounted in a case.

FIG. 3 is a plan view of configuration in which the circuit board and the functional modules are mounted in the case. In FIG. 3, the display 33 is indicated by a long dashed double-short dashed line. The circuit board 20 has a main part 20A extending in the X, Y directions and an extended part 20B extending along the upper side (edge) of the main part 20A and extending long on both sides of the main part 20A in the X direction. That is, one end and the other end of the extended part 20B in the longer direction thereof protrude from the main part 20A in one direction and the other direction of the main part 20A along the upper side of the main part 20A. In FIG. 3, a border line E1 represents an imaginary border between the main part 20A and the extended part 20B. The main part 20A may be rectangular in plan view.

The main part 20A includes a ground plane 27. The ground plane 27 is formed on a surface or an interlayer of the circuit board 20, and occupies most of the main part 20A in directions along the XY plane. In FIG. 3, the ground plane 27 is formed on the back surface (rear surface) of the circuit board 20, and indicated by a broken line. The main part 20A has a mounting plane for the control circuit 24, the PMIC 21, the first power supply IC 22, the second power supply IC 23, a connector for a display panel, connectors for photovoltaic panels and so forth, and these components are mounted thereon. Although not shown in FIG. 3, these are mounted on the back side (back/rear, rear surface) of the circuit board 20 in FIG. 3. The RFID IC 25 may be mounted on the main part 20A, on the extended part 20B or at the border between the main part 20A and the extended part 20B as long as the RFID IC 25 is near the border and connected to an antenna conductor 28. The main part 20A may have approximately the same lateral width as the display 33.

The extended part 20B includes the antenna conductor 28 and is integrated with the main part 20A. The antenna conductor 28 is formed on a surface (e.g. rear surface in FIG. 3) of the circuit board 20. An electromagnetic field that is radiated from the antenna conductor 28 is radiated in all directions in the YZ plane perpendicular to the longer direction of the antenna conductor 28 (X direction). The antenna conductor 28 may be formed on an interlayer of the circuit board 20.

The antenna conductor 28 includes a linear part 28a for radio wave radiation that has a length and thereby resonates at the frequency of a radio signal and a pattern part 28b for impedance matching. The linear part 28a may extend in the X direction to areas where the photovoltaic panels 31, 32 are arranged. The linear part 28a is longer than the lateral width of the main part 20A and the ground plane 27, and extends longer than the main part 20A and the ground plane 27 in one direction and the other direction of the X direction. The linear part 28a may constitute a dipole antenna having an electrical length that is a length of about a half wavelength of a radio signal of the RFID IC 25. The shortest distance L1 between the linear part 28a and the ground plane 27 is greater than the width L2 of the linear part 28a in the shorter direction thereof. The pattern part 28b has, for example, a loop-shaped pattern, and is disposed between the linear part 28a and a feeding point for the RFID IC 25 and matches impedances of these.

As shown in FIG. 3, the display 33 overlaps the main part 20A of the circuit board 20 in the Z direction and does not overlap the extended part 20B thereof in the Z direction. The display 33 may overlap the pattern part 28b and the extended part 20B as long as it does not overlap the linear part 28a of the antenna conductor 28. The photovoltaic panels 31, 32 are arranged in respective armpit parts W1, W2 two sides of each of which are delimited by the main part 20A and the extended part 20B of the circuit board 20. More specifically, one corner 31a of the photovoltaic panel 31 fits in the armpit part W1, and two sides 31e1, 31e2 of the photovoltaic panel 31 are along the lower side of the extended part 20B and the left side of the main part 20A, respectively, which delimit two sides. The same applies to the other photovoltaic panel 32.

Figure 4:
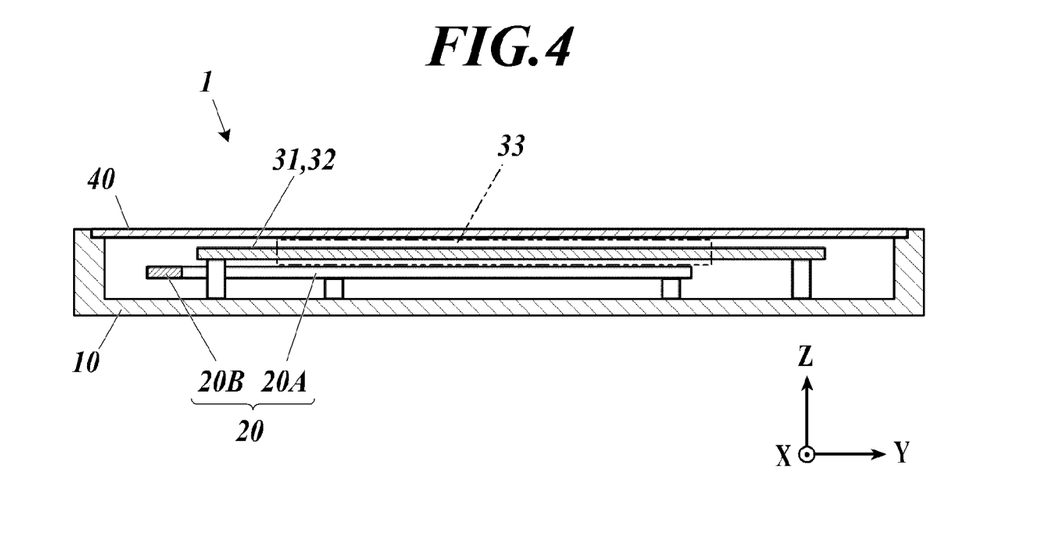
FIG. 4 is a vertical sectional view of the RFID tag of the first embodiment.

FIG. 4 is a vertical sectional view of the RFID tag of the first embodiment. FIG. 4 shows a section at the position of an arrowed A-A line in FIG. 3. In FIG. 4, the display 33 is indicated by an imaginary line. As shown in FIG. 4, the display 33 and the circuit board 20 are arranged so as to overlap one another in the Z direction. As viewed in a direction along the XY plane, the photovoltaic panels 31, 32 are arranged so as to overlap the display 33 and not to overlap the circuit board 20. As viewed in the direction along the XY plane, the photovoltaic panels 31, 32 may be arranged at a height where they do not overlap the display 33 or may be arranged at a height where they overlap the circuit board 20.

<Antenna Characteristics>

Figure 5A:
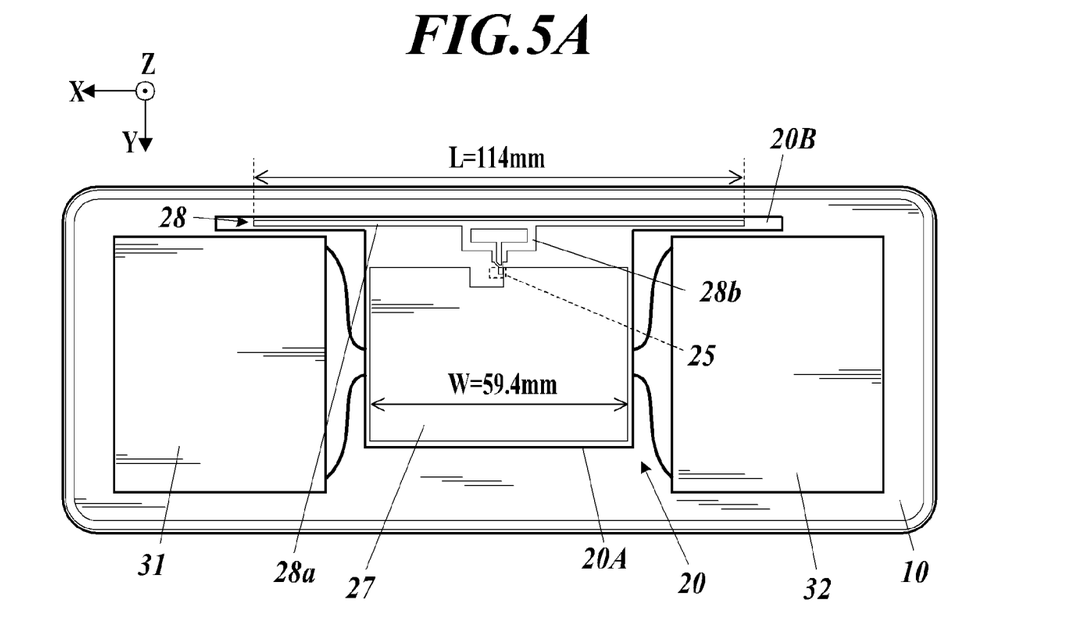
FIG. 5A shows simulation configuration of an RFID tag of the first embodiment.
Figure 5B:
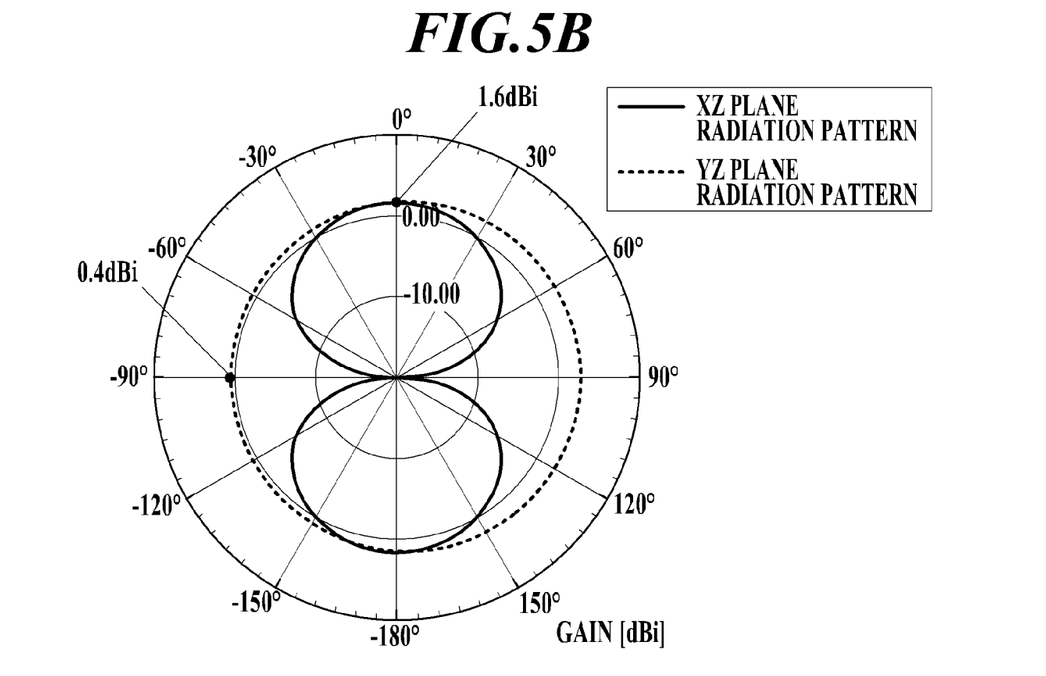
FIG. 5B shows antenna characteristics of the RFID tag of the first embodiment.
Figure 6A:
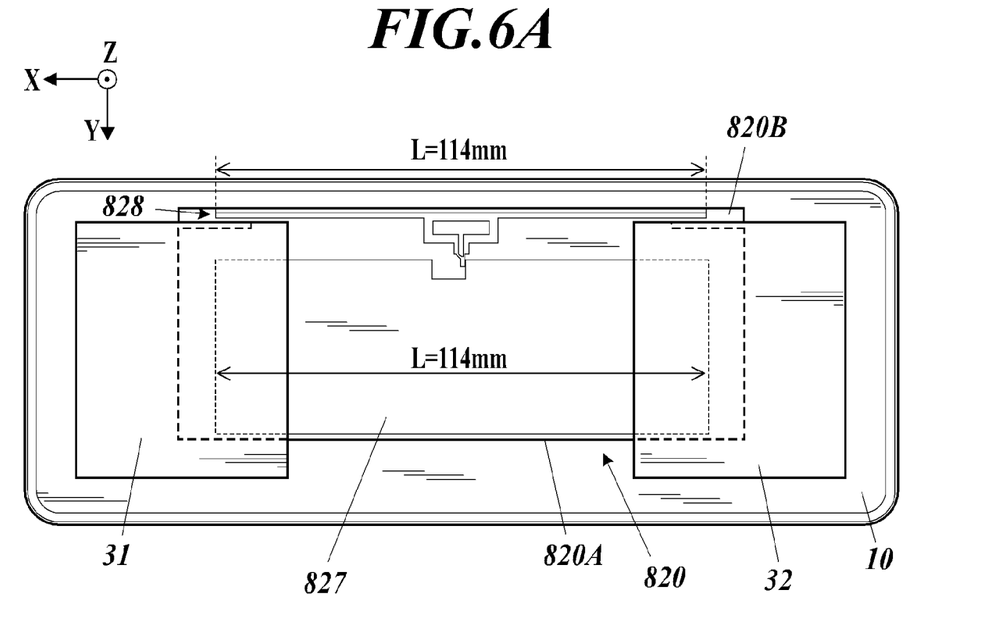
FIG. 6A shows simulation configuration of an RFID tag of a comparative example.
Figure 6B:
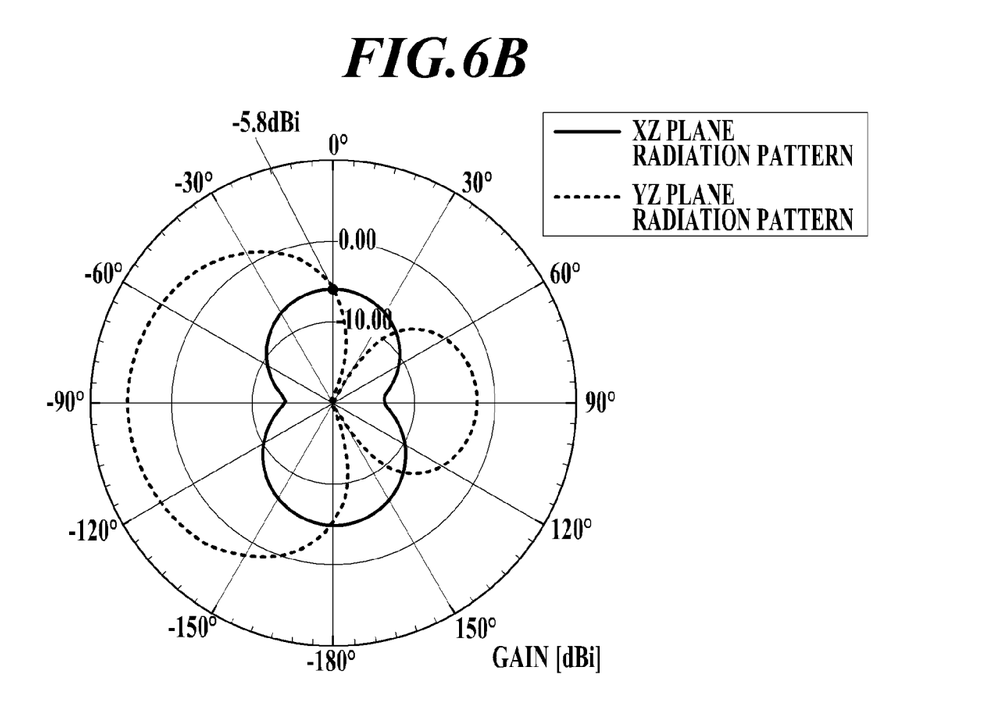
FIG. 6B shows antenna characteristics of the RFID tag of the comparative example.

FIG. 5A and FIG. 5B show simulation configuration and antenna characteristics of an RFID tag of the first embodiment. FIG. 6A and FIG. 6B show simulation configuration and antenna characteristics of an RFID tag of a comparative example. In FIG. 5A, which shows simulation configuration, an antenna conductor 28 and a ground plane 27 are indicated by thin solid lines for easy viewing. In FIG. 6A, an antenna conductor 828 and a ground plane 827 are indicated by thin solid lines in areas where they do not overlap photovoltaic panels 31, 32 for easy viewing. In the graph of antenna characteristics, +Z direction in FIG. 5A corresponds to 0° of an XZ plane radiation pattern and a YZ plane radiation pattern, −X direction in FIG. 5A corresponds to −90° of the XZ plane radiation pattern, and −Y direction in FIG. 5A corresponds to −90° of the YZ plane radiation pattern.

An RFID tag 1 of the first embodiment was simulated for antenna radiation characteristics with 114 mm as the length of the antenna conductor 28 and 59.4 mm as the lateral width of the ground plane 27 as shown in FIG. 5A. As a result, as shown in FIG. 5B, a high value (1.6 dBi) was obtained as antenna gain in the Z direction (0° direction). Further, satisfactory values (0.4 dBi at the lowest) independent of direction were obtained as antenna gain in the YZ plane.

The comparative example shown in FIG. 6A was also simulated. As shown in FIG. 6B, the antenna gain in the Z direction (0° direction) was a low value of −5.8 dBi. Further, as the antenna gain in the YZ plane, the value in the −Y direction (−90° direction) was high whereas the value in the Y direction (90° direction) was extremely low. The comparative example is an example that was configured such that the length of the antenna conductor 828 was 114 mm, the lateral width of a main part 820A of a circuit board 820 was the same as the lateral width of an extended part 820B, the lateral width of the ground plane 827 was the same as the length of the antenna conductor 828, and the other components were the same as those of the first embodiment in FIG. 5A.

In the antenna conductors 28, 828, strong electric fields are generated at the ends. The ground planes 27, 827 have an aspect of acting as a reflector of radio waves. In the configuration of the comparative example, presence of the ground plane 827, which acts as a reflector, near the ends, where strong electric fields are generated, of the antenna conductor 828 has generated directivity in the antenna gain in the YZ plane, and also reduced the antenna gain in the Z direction. Meanwhile, in the configuration of the first embodiment, the ground plane 27, which acts as a reflector, being away from the ends, where strong electric fields are generated, of the antenna conductor 28 has made the radiation characteristics in the YZ plane uniform regardless of direction, and also improved the antenna gain in the Z direction.

As described above, according to the RFID tag 1 of the first embodiment, the extended part 20B of the circuit board 20 and the antenna conductor 28 extend along the upper side (edge) of the main part 20A of the circuit board 20 so as to be longer than the main part 20A and the ground plane 27. Hence, of the antenna conductor 28, the ends where strong electric fields are generated are away from the ground plane 27. This suppresses concentration of electric fields of a radio signal between the ends and the ground plane 27. This also suppresses reduction of the antenna gain in a specific direction (Z direction) caused by the ground plane 27 acting as a reflector. These can improve the antenna gain, and also can provide the antenna characteristics suitable for the RFID tag 1 having a display function (high antenna gain characteristics in the direction of the display surface).

Further, according to the RFID tag 1 of the first embodiment, the extended part 20B and the antenna conductor 28 extend rightward and leftward so as to be longer than the main part 20A of the circuit board 20. Hence, both ends of the antenna conductor 28 can be away from the ground plane 27. This can further improve the antenna gain and provide more suitable antenna characteristics. This configuration is particularly effective for the antenna conductor 28 having the ends where strong electric fields are generated, such as a dipole antenna.

Further, according to the RFID tag 1 of the first embodiment, the antenna conductor 28 includes the linear part 28a for radio wave radiation, and the shortest distance L1 between the linear part 28a and the ground plane 27 is greater than the width L2 of the linear part 28a in the shorter direction thereof (FIG. 3). Thus, a portion of the linear part 28a other than its ends is also away from the ground plane 27. This can suppress, in this portion of the linear part 28a, reduction of the antenna characteristics in a specific direction (Z direction) caused by the ground plane 27 acting as a reflector.

Further, according to the RFID tag 1 of the first embodiment, the photovoltaic panels 31, 32 are arranged in the armpit parts W1, W2 two sides of each of which are delimited by the main part 20A and the extended part 20B of the circuit board 20. This configuration can prevent the photovoltaic panels 31, 32 from overlapping the antenna conductor 28 in the front-back direction, and also can secure effective arrangement spaces for the photovoltaic panels 31, 32.

Further, according to the RFID tag 1 of the first embodiment, the display 33 overlaps the main part 20A of the circuit board 20, and the two photovoltaic panels 31, 32 are arranged in the respective armpit parts W1, W2. This configuration makes it possible to arrange the display 33 and the two photovoltaic panels 31, 32 such that they align in a limited space of the case 10, and also to provide good antenna characteristics by the antenna conductor 28 not overlapping any of these in the front-back direction.

Second Embodiment

Figure 7A:
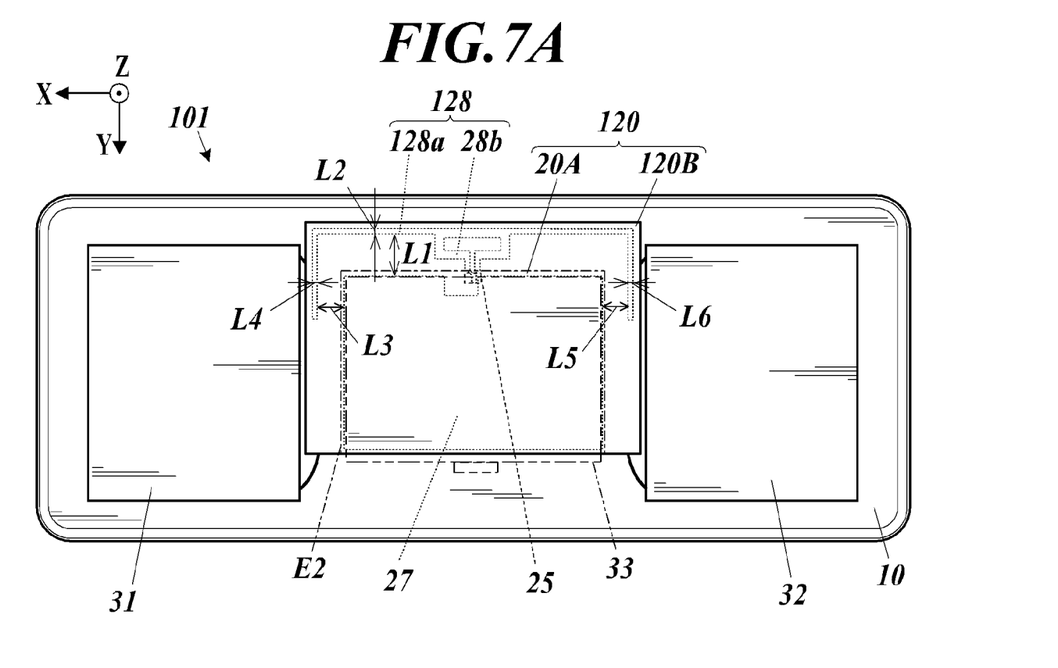
FIG. 7A is a plan view of an RFID tag of a second embodiment.
Figure 7B:
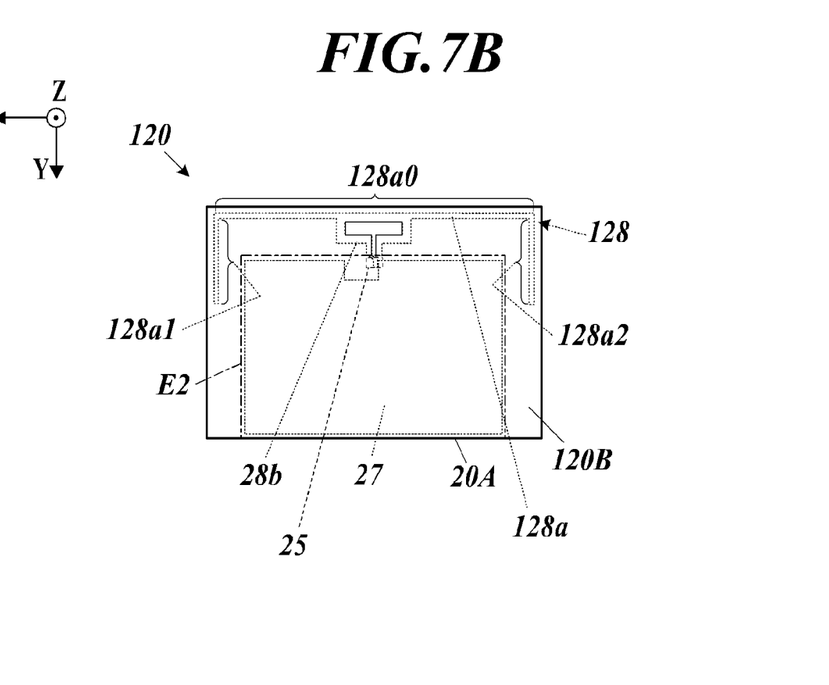
FIG. 7B is a plan view of a circuit board of the second embodiment.

FIG. 7A and FIG. 7B are a plan view of an RFID tag and a plan view of a circuit board of a second embodiment, respectively. In FIG. 7A, a display 33 is indicated by an imaginary line, and a lid 40 is not shown. An RFID tag 101 of the second embodiment is different from that of the first embodiment in shapes of an extended part 120B of a circuit board 120 and an antenna conductor 128, but substantially the same as that of the first embodiment about the other components. The like components are denoted by the same reference signs as those in the first embodiment, and detailed description thereof is omitted.

The circuit board 120 has a main part 20A extending in the X, Y directions and an extended part 120B extending along the left side, upper side and right side (left edge, upper edge and right edge) of the main part 20A. In FIG. 7A and FIG. 7B, a border line E2 represents an imaginary border between the main part 20A and the extended part 120B. The extended part 120B is disposed, as viewed in the Z direction, above the display 33, on the left of the display 33 (between the display 33 and the photovoltaic panel 31) and on the right of the display 33 (between the display 33 and the photovoltaic panel 32), and, as viewed in the Z direction, does not overlap any of the display 33 and photovoltaic panels 31, 32. The extended part 120B excluding the antenna conductor 128 may overlap the display 33. The main part 20A includes a ground plane 27 as in the first embodiment, and the components same as those of the first embodiment are mounted.

The extended part 120B includes the antenna conductor 128 and is integrated with the main part 20A. The antenna conductor 128 includes a linear part 128a for radio wave radiation that has a length and thereby resonates at the frequency of a radio signal and a pattern part 28b for impedance matching. The pattern part 28b is the same as that of the first embodiment.

The linear part 128a includes a central linear part 128a0 extending in the X direction above the main part 20A, a first linear part 128a1 extending in the Y direction between the display 33 and the photovoltaic panel 31 as viewed in the Z direction, and a second linear part 128a2 extending in the Y direction between the display 33 and the photovoltaic panel 32 as viewed in the Z direction. The linear part 128a may constitute a dipole antenna having an electrical length that is a length of about a half wavelength of a radio signal of the RFID IC 25. The shortest distance L1 between the central linear part 128a0 and the ground plane 27 is greater than the width L2 of the central linear part 128a0 in the shorter direction thereof. The shortest distance L3 between the first linear part 128a1 and the ground plane 27 is greater than the width L4 of the first linear part 128a1 in the shorter direction thereof. The shortest distance L5 between the second linear part 128a2 and the ground plane 27 is greater than the width L6 of the second linear part 128a2 in the shorter direction thereof.

<Antenna Characteristics>

Figure 8A:
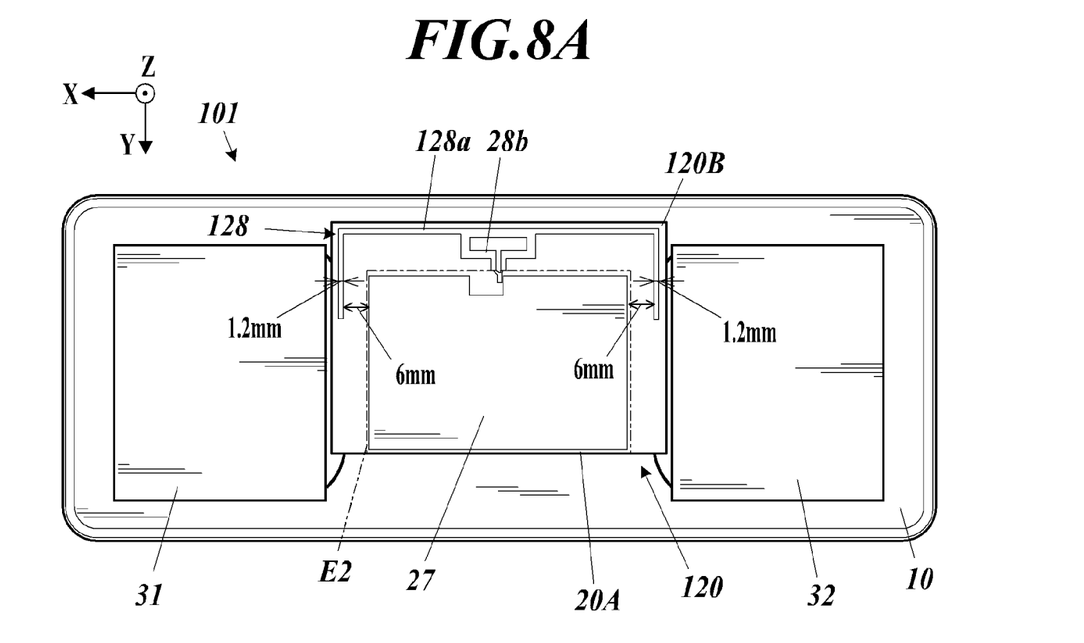
FIG. 8A shows simulation configuration of an RFID tag of the second embodiment.
Figure 8B:
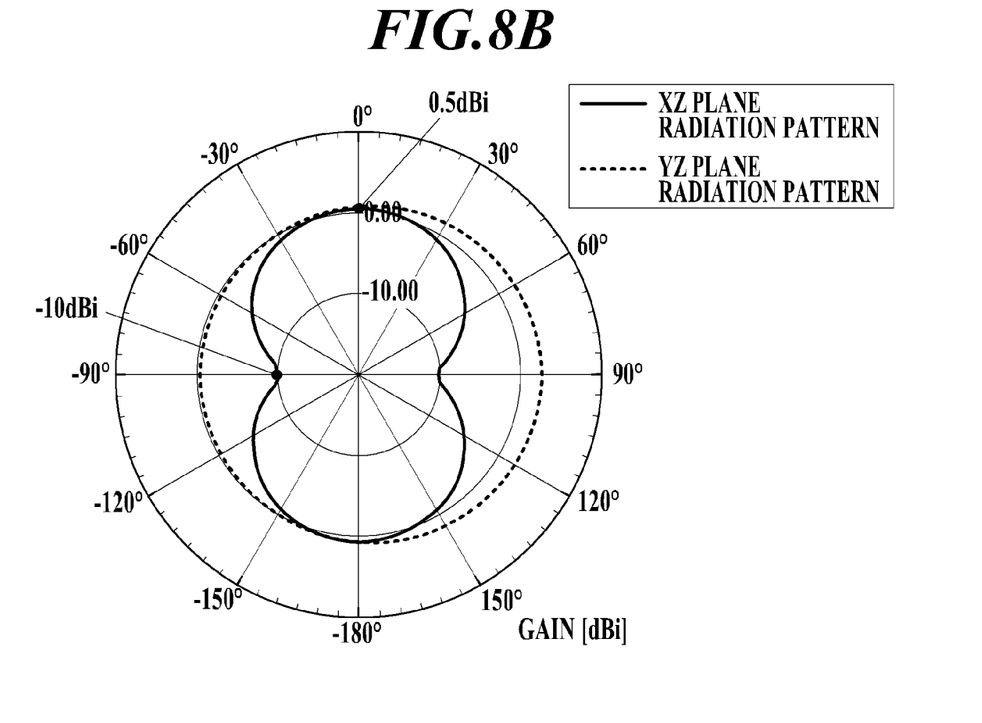
FIG. 8B shows antenna characteristics of the RFID tag of the second embodiment.

FIG. 8A and FIG. 8B show simulation configuration and antenna characteristics of an RFID tag of the second embodiment. In FIG. 8A, which shows simulation configuration, an antenna conductor 128 and a ground plane 27 are indicated by thin solid lines for easy viewing. In the graph of antenna characteristics, +Z direction in FIG. 8A corresponds to 0° of an XZ plane radiation pattern and a YZ plane radiation pattern, −X direction in FIG. 8A corresponds to −90° of the XZ plane radiation pattern, and −Y direction in FIG. 8A corresponds to −90° of the YZ plane radiation pattern.

An RFID tag 101 of the second embodiment was simulated for antenna radiation characteristics with 6 mm as the shortest distances L3, L5 between the first and second linear parts 128a1, 128a2 and the ground plane 27 and 1.2 mm as the width of the linear part 128a in the shorter direction thereof as shown in FIG. 8A. As a result, as shown in FIG. 8B, a value (0.5 dBi) higher than that of the comparative example shown in FIG. 6A and FIG. 6B was obtained as antenna gain in the Z direction (0°), and in the ±X direction, a certain level (−10 dBi) of antenna gain was obtained. Further, satisfactory values (0 to 2 dBi) independent of direction were obtained as antenna gain in the YZ plane.

In the antenna conductor 128 of the second embodiment, presence of the first and second linear parts 128a1, 128a2 extending in the Y direction has increased the antenna gain in the ±X direction as compared with the first embodiment. Further, of the antenna conductor 128, the ends, where strong electric fields are generated, being far away from the ground plane 27 have made electric fields not concentrate between the ends and the ground plane 27, and prevented reduction of the antenna gain. Still further, the ground plane 27 acting as a reflector on the first linear part 128a1 of the antenna conductor 128 has increased the antenna gain in the −X direction, and the ground plane 27 acting as a reflector on the second linear part 128a2 thereof has increased the antenna gain in the X direction. These have made the antenna characteristics close to being omnidirectional (non-directional) in the XZ plane too, and provided the radiation characteristics suitable for the RFID tag.

As described above, according to the RFID tag 101 of the second embodiment of the present disclosure, the extended part 120B of the circuit board 120 and the antenna conductor 128 extend along the upper side (edge) of the main part 20A, and also extend between the display 33 and each of the two photovoltaic panels 31, 32 as viewed in the Z direction. This configuration can achieve arrangement in which the display 33 and the two photovoltaic panels 31, 32 align, and also can provide good antenna characteristics by the antenna conductor 28 not overlapping any of these in the front-back direction. Further, the antenna conductor 28 includes the part extending in the X direction and the parts extending in the Y direction. As compared with the configuration of the first embodiment, this can make the antenna characteristics in the XZ plane close to being omnidirectional.

Further, according to the RFID tag 101 of the second embodiment of the present disclosure, the shortest distance L3 between the first linear part 128a1 of the antenna conductor 28 and the ground plane 27 is greater than the width L4 of the first linear part 128a1 in the shorter direction thereof (FIG. 7A). Similarly, the shortest distance L5 between the second linear part 128a2 and the ground plane 27 is greater than the width L6 of the second linear part 128a2 in the shorter direction thereof (FIG. 7A). Thus, of the antenna conductor 128, the ends where strong electric fields are generated at the time of transmission of a radio signal are arranged far away from the ground plane 27. This can suppress concentration of strong electric fields between the ends of the antenna conductor 128 and the ground plane 27, and hence can suppress deterioration of the antenna characteristics. Further, the action of the ground plane 27 as a reflector works toward improvement of the antenna gain on radio waves in the ±X direction, and makes the antenna characteristics in the XZ plane close to being omnidirectional.

In the above, some embodiments of the present disclosure have been described. However, the present invention is not limited thereto. For example, in the above embodiments, the two photovoltaic panels 31, 32 and the display 33 are used as the functional modules, but, as the functional modules, various modules may be used. Examples thereof include: sensor modules that detect temperature, humidity, illuminance, oscillation, acceleration and so forth; sound collectors; and loudspeakers. The details described in the embodiments can be appropriately modified within a range not departing from the scope of the invention.

INDUSTRIAL APPLICABILITY

The present disclosure is applicable to an RFID tag including a plurality of functional modules.

The invention claimed is:

1. An RFID tag comprising:
a circuit board that has an antenna conductor and a ground plane and where a control circuit and an RFID IC are mounted; and
a plurality of functional modules connected to the circuit board,
wherein the circuit board includes:
a main part including: a mounting plane for the control circuit; and the ground plane; and
an extended part including the antenna conductor and integrated with the main part, and
wherein the extended part and the antenna conductor are longer than one edge of the main part and disposed along the one edge.

2. The RFID tag according to claim 1, wherein one end and other end of the extended part and the antenna conductor protrude from the main part in one direction and other direction of the main part along the one edge.

3. The RFID tag according to claim 2,
wherein the plurality of functional modules includes a first functional module, a second functional module and a third functional module,
wherein the first functional module overlaps the main part in a direction perpendicular to a board surface and does not overlap the extended part in the perpendicular direction, and
wherein the second functional module and the third functional module are disposed in one armpit part and other armpit part, respectively, two sides of each of which are delimited by the extended part and the main part.

4. The RFID tag according to claim 2,
wherein the antenna conductor includes a linear part for radio wave radiation, and
wherein a shortest distance between the linear part and the ground plane is greater than a width of the linear part in a shorter direction of the linear part.

5. The RFID tag according to claim 4, wherein a functional module of the plurality of functional modules is disposed in an armpit part two sides of which are delimited by the extended part and the main part.

6. The RFID tag according to claim 2, wherein a functional module of the plurality of functional modules is disposed in an armpit part two sides of which are delimited by the extended part and the main part.

7. The RFID tag according to claim 1,
wherein the antenna conductor includes a linear part for radio wave radiation, and
wherein a shortest distance between the linear part and the ground plane is greater than a width of the linear part in a shorter direction of the linear part.

8. The RFID tag according to claim 7, wherein a functional module of the plurality of functional modules is disposed in an armpit part two sides of which are delimited by the extended part and the main part.

9. The RFID tag according to claim 1,
wherein a functional module of the plurality of functional modules is disposed in an armpit part two sides of which are delimited by the extended part and the main part.

10. An RFID tag comprising:
a circuit board that has an antenna conductor and a ground plane and where a control circuit and an RFID IC are mounted; and
a first functional module, a second functional module and a third functional module connected to the circuit board,
wherein the circuit board includes:
a main part including: a mounting plane for the control circuit; and the ground plane; and
an extended part including the antenna conductor and integrated with the main part,
wherein the first functional module overlaps the main part in a direction perpendicular to a board surface and does not overlap the extended part in the perpendicular direction,
wherein the second functional module and the third functional module are disposed on respective sides of the first functional module, and
wherein as viewed in the perpendicular direction, the extended part and the antenna conductor extend (i) along one edge of the main part, (ii) between the first functional module and the second functional module, and (iii) between the first functional module and the third functional module.

11. The RFID tag according to claim 10,
wherein the antenna conductor includes: a first linear part extending between the first functional module and the second functional module; and a second linear part extending between the first functional module and the third functional module,
wherein a shortest distance between the first linear part and the ground plane is greater than a width of the first linear part in a shorter direction of the first linear part, and
wherein a shortest distance between the second linear part and the ground plane is greater than a width of the second linear part in a shorter direction of the second linear part.

* * * * *